Figures 1, 2:
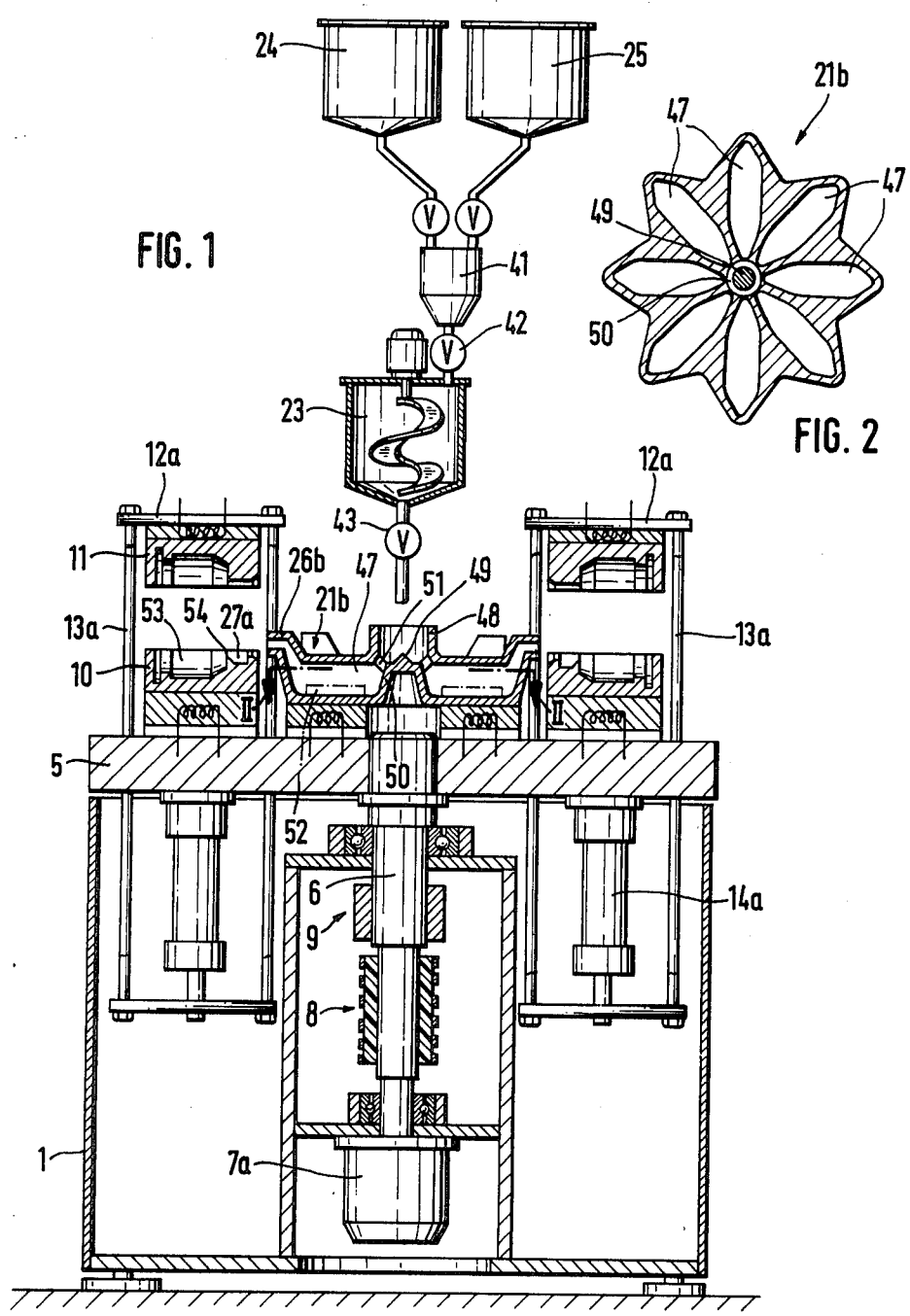

United States Patent [19]

Halm

[11] 4,094,624
[45] June 13, 1978

[54] CENTRIFUGAL CASTING APPARATUS

[76] Inventor: Richard Halm, Silcherstrasse 54, D 7061 Baltmannsweiler, Germany

[21] Appl. No.: 753,885

[22] Filed: Dec. 23, 1976

[30] Foreign Application Priority Data

Dec. 27, 1975 Germany .............................. 2558893

[51] Int. Cl.² .............................................. B29C 5/04
[52] U.S. Cl. .................................... 425/434; 264/311
[58] Field of Search ................. 425/425, 434; 264/311

[56] References Cited

U.S. PATENT DOCUMENTS

| | | | |
|---|---|---|---|
| 2,433,065 | 12/1947 | Rubissow | 264/311 X |
| 2,542,757 | 2/1951 | Dubin | 425/434 |
| 2,618,031 | 11/1952 | Mazer | 264/311 X |
| 3,391,423 | 7/1968 | Charvat et al. | 264/311 X |
| 3,505,437 | 4/1970 | Eichmann et al. | 264/311 X |
| 3,642,399 | 2/1972 | Barainsky et al. | 264/311 X |
| 3,742,109 | 6/1973 | Zijp et al. | 264/311 |

*Primary Examiner*—Robert L. Spicer, Jr.
*Attorney, Agent, or Firm*—Roylance, Abrams, Berdo & Farley

[57] ABSTRACT

Casting apparatus including a rotatable turntable, a centrally mounted supply tank with a central filler opening and a plurality of radially extending supply chambers connected to the filler opening. A number of split casting molds, one for each supply chamber, are disposed radially outwardly of the supply chambers, each mold having an independently operable lifting mechanism for opening the mold. Each supply chamber has an outlet nozzle above the full level of the chamber. The volume of each supply chamber is equal to the volume of its associated mold. The filler opening has an indicator to permit observation of the level to which the supply chambers have been filled.

9 Claims, 2 Drawing Figures

U.S. Patent    June 13, 1978    4,094,624

CENTRIFUGAL CASTING APPARATUS

This invention relates to a centrifugal casting apparatus for the production of articles to be manufactured from cast resin, particularly electric motors.

BACKGROUND OF THE INVENTION

Centrifugal casting devices of the general type wherein the rotation of a table causes flow of casting material into molds is known. In some prior art devices of this general type, the mass of casting resins which is to be conducted into the casting mold is controlled by means of a pneumatic pressure sensor responding to the state of filling of the casting mold. A closing valve which controls the casting mold nozzle responds to a control signal from the pressure sensor. The control of the valve with the help of the sensor is a very expensive apparatus because one pressure sensor must be provided for each casting mold and because, in most instances, a number of casting molds are present on each centrifugal casting apparatus. A device of this type is shown in German Offenlegungsschriften 2,508,486.

BRIEF DESCRIPTION OF THE INVENTION

An object of the present invention is to provide an apparatus in which the control of the accurate filling of the casting molds is accomplished at considerably less expenditure in the prior art, and is particularly useful in the case of devices wherein the supply tank for holding the resin before it is introduced into the molds is to be kept at a high temperature for as much of the casting cycle as possible.

Briefly described, the apparatus includes a centrifugal casting apparatus for producing cast articles from casting resin comprising the combination of a turntable having an axis of rotation; means for supporting and rotating the turntable about the axis, a supply tank on the turntable, the supply tank having a supply chamber, casting nozzle means for conducting casting resin out of the supply chamber when the turntable is rotated and for preventing flow of resin out of the chamber when the turntable is at rest, filler means for receiving casting resin and for conducting the resin into the supply chamber, and means in the filler means for indicating the degree to which the supply chamber has been filled with resin; and a casting mold on the turntable, the casting mold having means defining an inlet opening directed toward the casting nozzle on the supply chamber, the supply chamber being located on the turntable between the axis of rotation and the casting mold, the supply chamber having a resin capacity substantially equal to the internal volume of the casting mold.

With this apparatus, a source of resin can supply material to the filler means until the indicator discloses that the supply chamber has been properly filled, thereby eliminating the control arrangement and the closing valve associated with each casting mold. Because the supply chamber has a volume substantially equal to the casting mold, the supply chamber is completely emptied in the course of each casting process so that no casting resin remains therein and there is therefore no danger either of its hardening in the supply tank or in the area of the casting nozzle.

Also, the supply tank can be filled quickly immediately prior to the casting process and can be emptied quickly during the casting process. Thus, it can be kept at a high temperature. Because of the quick-filling process, the short tarry time of the casting resin in the supply chamber and the quickcasting process, the temperature in the supply tank can be kept relatively high. This permits the use of casting resins to which a relatively large quantity of quality improving fillers have been added, the apparatus requiring a liquid casting resin for pouring.

The filler means includes a protrusion marked to indicate the level of filling which can be easily and quickly observed by an operator.

In the event of a change in the volume of a casting mold, a body for displacing some resin can be introduced into the supply chamber, keeping the volume of the supply chamber equal to a decreased casting mold volume.

The casting mold can also be provided with an antechamber to provide some tolerance in the equality of volumes of the supply chamber and casting mold. Also, the opening between the antechamber and the main molding chamber of the casting mold can be provided with an orifice such that a notch results between the cast article and its sprue so that the sprue can easily be broken off from the casting part.

Still further, means can be provided for independently opening and closing the casting mold so that one mold can be opened at a time for the insertion of components to be combined with the casting resin in the mold, thereby decreasing heat losses and permitting the castings to remain longer in the mold so that stresses in the working material can better be neutralized or annealed.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a side elevation, in partial section, of a centrifugal casting apparatus in accordance with the invention; and FIG. 2 is a partial plan view, in section, along lines II—II of FIG. 1.

As shown in the figures, the apparatus includes a machine stand which is a closed framework of a generally cylindrical shape at the upper end of which is a turntable 5 having a downwardly extending vertical driving shaft mounted in bearings for rotation about the central axis of the shaft and the table. The shaft can be driven by a driving motor 7a mounted within the housing and disposed coaxially with the driving shaft. On the driving shaft electric rotary feeds 8, in the nature of slip rings are provided for supplying energy to apparatus on the rotating portion of the system, and similar rotary feeds 9 for supplying hydraulic and pneumatic pressure agents are provided. These rotary couplings are conventional in nature and will not be further described herein.

The turntable 5 carries a plurality of bottom half casting molds 10 which are circularly disposed near the outer portions of the turntable, the molds being equally spaced apart. Each bottom half mold is operably associated with a top half mold 11 which is connected to a lifting member 12a which is connected by vertically extending slide bars 13a to the piston of an operating piston and cylinder mechanism 14a disposed below turntable 5 within housing 1, the piston rod of each cylinder emerging from the cylinder jacket on the end thereof facing away from turntable 5. Linkage 13a penetrates turntable 5 and is slidably mounted therein, the apparatus being shown in FIG. 1 with the movable portions of these devices in their uppermost position. Cylinder 14a is operated perferably by an hydraulic pressure agent. Control devices not shown are operated by an operator as desired and serve for the control of the supply of the pressure agent originating from a source of fluid under pressure, not shown, to the operating cylinders. It should be noted that the cylinders 14a are independently operated so that each mold can be opened and closed, as desired, independently of the other molds on the turntable.

Radially inwardly of the circular array of bottom half casting molds 10, there is a supply tank 21b for the casting resin which can be, for example, epoxy resin. The supply tank 21b is provided with a plurality of circularly disposed supply chambers 47, FIG. 2, the number of supply chambers being equal to the number of casting mold sets 10 and 11 on the turntable. The volume of each supply chamber 47 is substantially equal to the volume which is to be filled by the casting resin in its associated casting mold 10 and 11. Each of the chambers is connected to a spraying or casting nozzle 26b at the outer end of the supply chamber, the nozzle tapering upwardly to the outside and pointing radially outwardly. It will be observed that each casting nozzle 26b is associated with one of the casting mold sets 10 and 11 and the nozzle can be arranged to be spaced for the opening in the casting mold by a distance on the order of 1 to 10 millimeters. Alternatively, the casting nozzle can be connected with the casting mold assigned to it.

The arrangement of the nozzles is such that each nozzle is operatively associated with an inclined end wall of its supply chamber with the lower extent of the nozzle being above the "full" level of the supply chamber so that, when the table is at rest, no casting resin can flow from the supply chamber through the nozzle. However, when the table is rotated, the resin is forced upwardly along the inclined wall and passes outwardly through the nozzle into the casting mold.

Each casting mold set 10 and 11 is kept at a relatively high temperature of, for example, 150° C., so that the casting resin will cure quickly in the casting mold. As will be recognized, because of the fact that the supply tank and supply chambers are filled just prior to the centrifugal casting process and because the supply chambers are emptied very quickly during the centrifugal process, it is possible to maintain the supply tank at a high temperature substantially equal to the temperature of the casting mold, thereby preventing the casting resin from being chilled which would necessitate its being reheated in the casting mold itself before curing can occur. The supply chambers 47 of the supply tank 21b and the casting nozzles 26b are developed such that through the centrifugal force occurring during rotation of turntable 5, the casting resin located in supply tank 21b and casting nozzle 26b will reach the casting mold 10 and 11 completely, i.e., the individual supply chambers are emptied completely.

Filler means including an open filler cap 48 is centrally located in supply tank 21b, the filler cap being a cup-shaped upwardly opening chamber having conduits 51 extending from the lower outer portions of the chamber into the individual supply chambers 47. A frusto-conical body 50 having a point 49 is centrally located in the supply chamber, the point rising from essentially the bottom of the supply tank. The upper portion of frustum 50 lies at the same level with the upper portion of supply chambers 47 and the point 49 extends by the height of the filling tolerance into filler cap 48. The casting nozzle 26b projects above point 49 so that during the filling of the supply tank 21b, no casting resin can flow out of the casting nozzles, as previously indicated.

Each bottom half 10 of the casting mold set is provided with a small antechamber 27a in its inlet in order to accept additional resin above that which can be received by the main casting chamber, thereby balancing out deviations within a certain tolerance of the filler quantities transferred from the supply tank 21b as well as differences likewise lying within certain tolerances between the spaces to be filled in the same casting mold 10 and 11 during different casting processes. Between antechamber 27a and main chamber 53 of the casting mold set, there is a constriction 54 so that a sprue notch develops which, after curing of the cast body, permits the body formed in the sprue to be easily broken off. The inlet of the casting mold 10 and 11 and the casting nozzle 26b assigned to it are essentially coaxially disposed along a common radius.

Above the centrifugal casting arrangement there are two supply tanks 24 and 25 for different components of the casting resin, for example, the resin itself and its hardener. Supply tanks 24 and 25 are connected through suitable valves to a dosing arrangement 41 disposed beneath the tanks, the outlet of the dosing device emptying through a valve 42 into a mixer 24 wherein the casting resin is mixed. The outlet of mixer 23, controlled by a valve 43, is located above filler cap 48 of supply tank 21b.

The components of the casting resin are fed from the supply tanks 24 and 25 to the mixer 23 in a ratio determined by dosing arrangement 41. These components are mixed intensively in mixer 23. It is always necessary to feed a sufficient quantity of casting resin to the mixer during the operation so that the supply tank 21b can be filled in correspondence with the operating process. The quantity of casting resin is to be regulated by a corresponding selection of the height of frustrum 50 and possibly also the height of supply chambers 47 in such a way that mold set 10 and 11 will be continuously filled with casting resin independently of deviations, within certain tolerances and occurring during different filling processes. Any possible excess casting resin is taken up by the antechamber 27a. Thus, the antechamber must be dimensioned so that the supply tank 21b inclusive of the casting nozzle 26b will be completely empty after each casting process. The insertion of the casting resin into the supply tank 21b is accomplished by the individual operating the apparatus in such a manner than frustrum 50 is completely covered up by the casting resin located in the supply tank 21b, but so that point 49 still projects from the casting resin. If desired, a scribe mark on the like on point 49 can be provided to indicate an exact filling level.

In order to cast around parts of electric motors, components of the motor are inserted into an open casting mold set which, in order to avoid heat loss, is immediately closed as soon as the components are placed therein. The turntable 5 is then turned through an angle equal to 360° divided by the number of casting mold sets provided on the turntable so that the operator can open the next mold in sequence and insert the necessary components therein. Supply tank 21b is filled while the components of the electric motors are being inserted into the casting mold so that the filling process is completed just prior to the time that the last of the casting mold sets on turntable 5 has been provided with the electric motor components. The beginning of the filling of the supply tank is delayed as long as possible so that the resin sits in the supply tank for as short an interval as can be achieved.

As soon as all casting mold sets 10 and 11 are provided with the necessary electric motor parts and are closed and as soon as all supply chambers 47 of supply tank 21b are filled, then the centrifugal process begins by rotation of table 5 to cause the casting resin in the supply chambers 47 to be centrifuged into the associated casting mold sets 10 and 11. The molds are thus filled completely and any excess remains in the antechambers, completely emptying the supply tank.

After curing, the casting mold 10 and 11 are individually opened and the molded articles are removed. After emptying one casting mold set, the components for the next casting operation are inserted into the mold set and the mold set is then closed, so that as soon as the last completed article from one centrifugal casting operation is removed and the new part inserted therein, the system is ready for another operation. The process of filling the supply chamber and centrifuging is then repeated.

A displacing body 52 can be inserted in each of the supply chambers 47 and can, if desired, be attached therein in order to be able to adapt the volumes of the supply chambers to the volumes of the casting mold sets which are to be filled with casting resin whenever other parts of electric motors are to be produced or, for example, when other casting molds are used. For the insertion and removal of displacing body 52 into the supply chamber 47, the chamber can be provided at its upper portion with a lid, not shown. It will be recognized that the apparatus can be provided with sets of displacing bodies having different volumes.

It will also be recognized that the supply tank and the individual halves 10 and 11 of the casting mold sets are provided with heating coils to produce and maintain the elevated temperature therein, these coils being schematically illustrated in FIG. 1. Also, thermostatic control means of conventional type can be provided to control the temperature of these devices at the appropriate curing temperatures, depending upon the specific resins to be used. This control apparatus forms no specific part of the present invention.

Instead of using a visual check of the state of filling of the supply tank 21b, it is possible to use a sensor, such as a pneumatic sensor, controlling the valve 43, the sensor being provided in filler cap 48. In order to operate valve 43, an operating cylinder may be used, the connection of which with the source of pressure agent can be controlled by the sensor. Also, the sensor can be mounted such that it can be raised and lowered for the purpose of adjusting variable levels of filling in the supply chamber. In this case, only one sensor for a plurality of casting mold sets is needed. In the previously described embodiment, the volumes of the casting mold sets 10 and 11 and consequently the volumes of the individual supply chamber 47 are equal. It will be evident that in the case of different volumes of the individual casting mold sets, the volumes of the supply chambers associated with these casting mold sets are also correspondingly different. Different capacities of the otherwise equal volume supply chambers may be achieved simply by a corresponding selection of displacement bodies 52.

It will also be recognized that individual supply chambers 47 can be manufactured as individual containers which are connected by suitable conduit to a filler cap 48 which is common to all of the individual container. In such case, the supply chambers 47 interconnected only by the filler cap 48 can be regarded in their totality as a supply container.

While certain advantageous embodiments have been chosen to illustrate the invention, it will be understood by those skilled in the art that various changes and modifications can be made therein without departing from the scope of the invention as defined in the appended claims.

I claim:

1. A centrifugal casting apparatus for producing cast articles from casting resin comprising the combination of a turntable having an axis of rotation;
means for supporting and rotating said turntable about said axis;
a supply tank on said turntable and rotatable therewith, said supply tank having
 a supply chamber adapted to receive and hold a quantity of casting resin before said turntable is rotated,
 casting nozzle means for conducting casting resin by centrifugal force out of said supply chamber when said turntable is rotated and for preventing flow of resin out of said chamber when said turntable is at rest,
 filler means for receiving casting resin and for conducting said resin into said supply chamber, and
 means in said filler means for indicating the degree to which said supply chamber has been filled with resin before the resin is conducted out of said supply chamber;
means for supplying casting resin to said filler means; and
a casting mold on said turntable, said casting mold having
 means on said casting mold defining an inlet opening directed toward said casting nozzle on said supply chamber; said supply chamber being located on said turntable between said axis of rotation and said casting mold,
 said supply chamber having a resin capacity substantially equal to the internal volume of said casting mold.

2. An apparatus according to claim 1 wherein said means for indicating includes an upwardly extending projection having at least one mark thereon for indicating filling level.

3. An apparatus according to claim 1 and including a displacing body,
said supply chamber being adapted to receive said body to decrease the resin capacity of said chamber.

4. An apparatus according to claim 1 wherein said casting mold includes
means defining a mold chamber; and
means defining an antechamber between said mold chamber and said inlet opening, the volume of said antechamber being significantly smaller than the volume of said mold chamber.

5. An apparatus according to claim 4 wherein said means defining said mold chamber and said antechamber includes means defining an orifice between said chambers, the size of said orifice being smaller than either of said chambers.